J. STEVENS.
Domestic Boiler.
No. 5,890.  Patented Oct. 31, 1848.
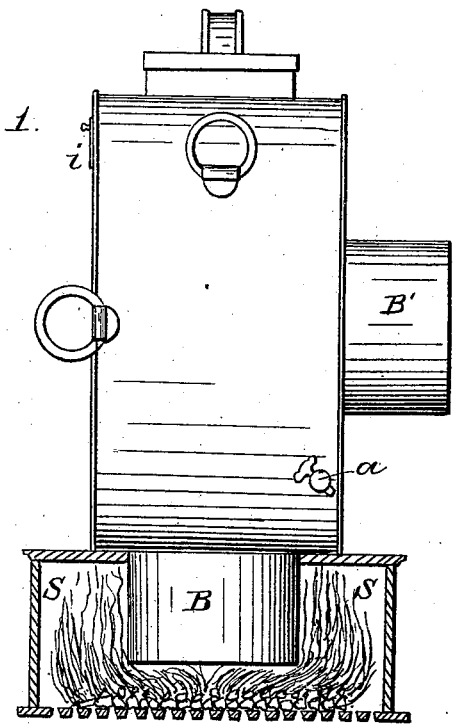
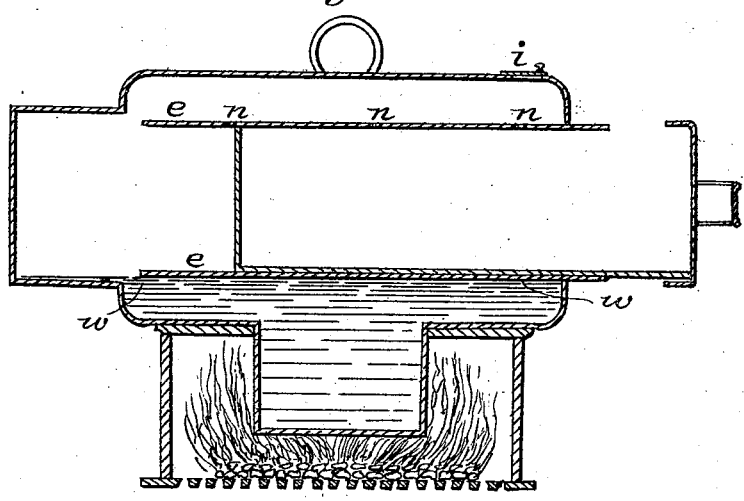

UNITED STATES PATENT OFFICE.

JAMES STEVENS, OF MIDDLETOWN, MARYLAND.

COOKING UTENSIL FOR BOILING AND STEAMING.

Specification of Letters Patent No. 5,890, dated October 31, 1848.

*To all whom it may concern:*

Be it known that I, JAMES STEVENS, of Middletown, in the county of Frederick and State of Maryland, have invented a new and useful Improvement in Culinary Apparatus, which I call "Stevens's Combined Boiler and Steamer," of which the following is a full, clear, and exact description, reference being had to the annexed drawings of the same, making part of this specification, in which—

Figure 1 is a side elevation of the vessel, showing its position when used as a boiler, and placed over the fire of a range or stove represented in section; Fig. 2 is a vertical longitudinal section of a vessel slightly differing from Fig. 1, placed over the fire of a range or stove, in the position in which it is used as a steamer and having the drawer to contain the articles to be steamed partially drawn out.

The same letters indicate the same parts in all the figures.

The nature of my invention and improvement consists in constructing culinary vessels for boiling or steaming on stoves or ranges, with two projecting bottoms or fire surfaces made in the usual manner, of equal size and similar form, the bottoms being placed on adjacent sides so that by simply changing the position of the vessel by removing one bottom from the fire and putting the other over it, it is converted from a boiler to a steamer, and vice versa.

Fig. 1 represents the vessel used as a boiler, its mouth being on the top and horizontal, and the projecting fire bottom or surface B exposed to the flames of a range or stove (*s*) shown in section; the hot water is withdrawn by means of the cock *a* which is inclined to both bottoms, so that water may be withdrawn from it with equal facility when the vessel is used as a boiler or as a steamer.

Fig. 2 represents the vessel in section used as a steamer, the bottom B′ being now placed over the fire and the mouth on the side and vertical, the water is represented as filling the vessel to the line *w*; the lid of the boiler is in this case removed and replaced by the drawer D in which the meat or vegetables to be steamed, is introduced into the interior of the vessel. *e e* are partition plates to support the drawer, they are perforated as at *n n n* with any required number of holes to permit the free circulation of the steam; these partitions, together with the drawer, may be arranged in various ways and made in a great variety of forms, so likewise, may the external form of the vessel be varied to suit the different circumstances under which is may be necessary to use it, or in accordance with the peculiar views and taste of the constructor.

On one of the sides of the vessel an aperture is made to introduce water into the vessel or to permit the escape of any excess of steam, this aperture is opened and closed by means of a slide valve (*i*) which turns on a pivot. When the vessel is used as a boiler the drawer is taken out and set aside.

Of the manifold advantages to be derived from the use of steam as an agent for cooking food, I need not here speak, as they are well known to all who are conversant with the culinary art, and to render manifest the great facility with which this agent may be employed by means of my invention it is merely necessary to examine the apparatus. One of its peculiar advantages however is that it can be used with equal facility both as a boiler and as a steamer, and the entire space used for steaming can be filled with water whenever the same is required to be heated in large quantity.

What I claim as my invention and desire to secure by Letters Patent is—

Constructing culinary vessels for boiling or steaming with two projecting bottoms or heating surfaces on adjacent sides, so that by merely changing its position the vessel is converted from a boiler to a steamer, or from a steamer to a boiler, as herein described.

In testimony whereof I have hereunto subscribed my name this twentieth day of January, 1848.

JAMES STEVENS.

Witnesses:
I. S. SMITH,
P. H. WATSON.